June 10, 1930.                L. R. CORNELIUS                1,762,914
                                ARTIFICIAL BAIT
                               Filed May 7, 1929
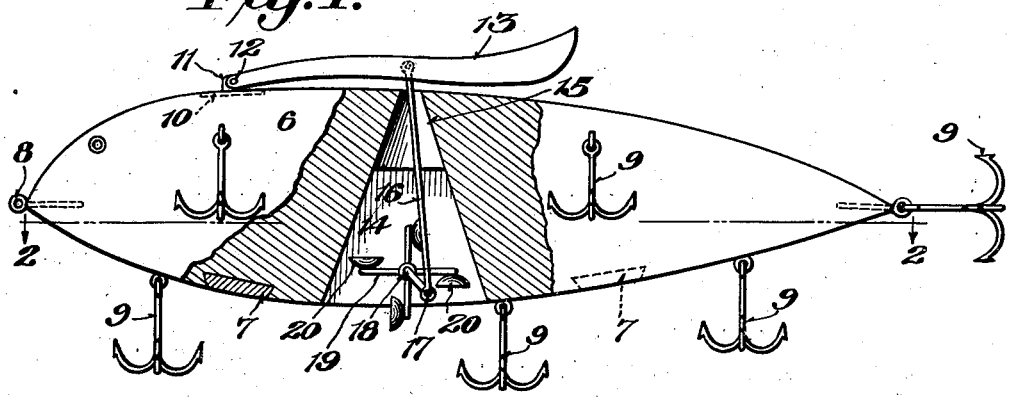
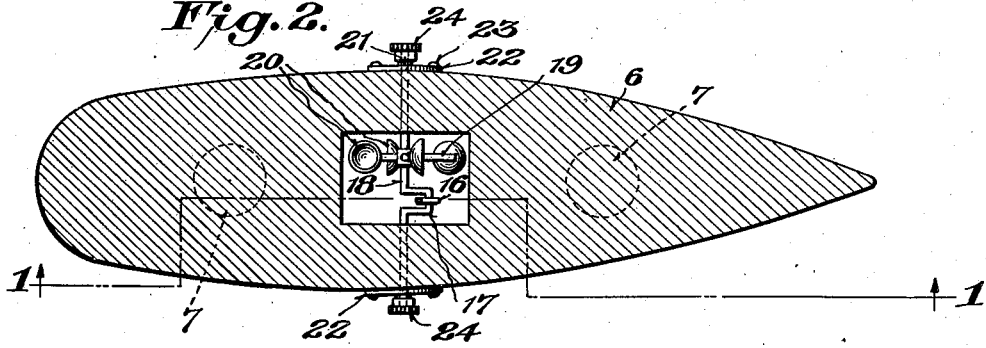
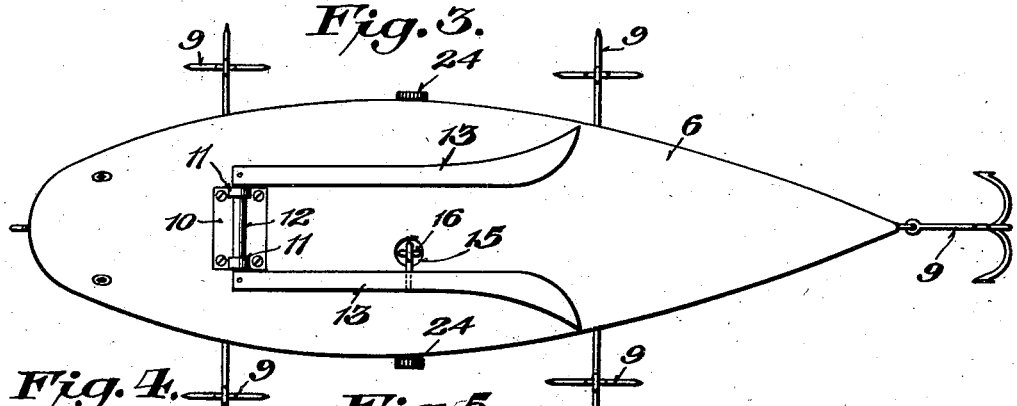
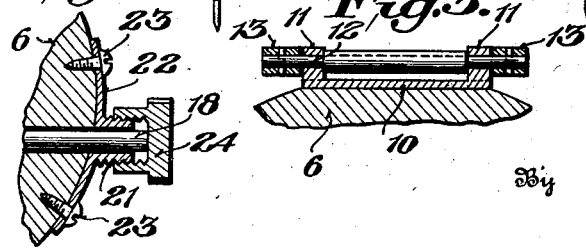
Inventor
Lee Roy Cornelius,
By Royal E. Burnham,
Attorney Patented June 10, 1930

1,762,914

UNITED STATES PATENT OFFICE

LEE ROY CORNELIUS, OF NEAR DANVILLE, ILLINOIS, ASSIGNOR OF ONE-HALF TO WILLIAM P. WINTHER, OF DANVILLE, ILLINOIS

ARTIFICIAL BAIT

Application filed May 7, 1929. Serial No. 361,018.

It is an object of this invention to provide artificial bait formed in simulation of live bait, having certain parts actuated to move substantially like a living bait.

Another object of the invention is to provide bait having actuating means occupying a minimum space in its body, whereby it is necessary to afford only a comparatively small hollow portion in the body for accommodation of the actuating means.

It also is an object of the invention to avoid use of a longitudinal crank-shaft driven by a propeller-wheel at the front or rear of the body, and thus obviate the necessity of employing more or less complicated and expensive means for connecting line and hook at the front and rear of the body, respectively.

With these and other objects in view, the invention provides a crank-shaft disposed transversely within the body of the bait, and driven by a paddle or cup wheel located mostly within the body and having its periphery extending slightly below the body, so that the wheel is driven when the bait is drawn through water or is in a current of water, the shaft being arranged to actuate a wing or the like on top of the body. Moreover, the position and arrangement of the paddle-wheel is such that, when the bait is being drawn along the bottom, even slowly in still water, at a rate insufficient to turn a propeller-wheel, the paddle-wheel is turned by engagement with the bottom and the wing or the like moved up and down.

The invention also provides means whereby the speed of the actuating mechanism is regulated.

When considered with the description herein, the characteristics of the invention are apparent from the accompanying drawing, forming part hereof, wherein artificial bait in simulation of a minnow or other small fish is disclosed, for purposes of illustration.

Although the disclosures herein exemplify what now is considered to be a preferable embodiment of the invention, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawing, of which—

Fig. 1 is a section on the line 1—1, Fig. 2;
Fig. 2 is a section on the line 2—2, Fig. 1;
Fig. 3 is a top view;
Fig. 4 is a view of one of the crank-shaft journals;
Fig. 5 is a view of the pivotal mounting of the wing.

The bait includes a suitably buoyant body 6, which preferably is solid except for the chamber hereinafter referred to. The body shown is in simulation of a minnow or other small fish; and it may, if desired, be provided in its lower portion with weights 7 to maintain it normally in upright position in water. The body is provided with an eye 8 or other suitable line-connecting means at its head and with hooks 9 at its tail and other suitable places.

A plate 10 secured to the top, and in the front part, of the body has short upstanding members 11 in which is journaled a shaft portion 12 of a wing comprising rearwardly-extending legs 13.

In order to impart swinging movement to the wing, actuating means is positioned in a chamber or recess 14 in the body below the wing and open at the bottom of the body. A passage or channel 15 extends from the top of the chamber to the top of the body. The actuating means includes a connecting-rod 16 attached to the wing, extending through the passage into the chamber, and connected to a crank 17 of a transverse shaft 18 having fixed thereon a wheel 19 formed with peripheral paddles or cups 20 extending at a portion of its periphery slightly below the bottom of the body, whereby the wheel is turned and the shaft driven while the bait is drawn through, or is in a current of, water, or is being dragged along the bottom.

The shaft 18 extends at its ends through body side walls of the chamber into exteriorly-threaded journals 21 projecting outside of plates 22 secured to the body by suitable fasteners 23. Cap-screws 24 on the journals prevent longitudinal displacement of the shaft. By turning, and thus adjusting, either or both of the cap-screws, the shaft may either be left to rotate freely between the heads of the screws or subjected by the heads to such binding pressure at its ends as will prevent too fast rotation thereof and actuating of the wing in a swift current, or in fast trolling, or in other uses where the relative movement of the bait and water is fast.

In use, the bait is drawn through the water, or held stationary in a current of water, by a line attached to the eye 8, the weights 7 being sufficiently heavy to maintain the bait below the surface of the water or on the bottom, dependent upon the amount of drag on the line. While the bait is being drawn through the water or held stationary in a current of water, the wheel 19 is rotated by means of water action against the paddles or cups of the wheel, the crank-shaft 18 upon which the wheel is mounted is driven, and the wing-legs 13 are caused to swing up and down through the instrumentality of the connecting-rod 16. As the body 6 is in simulation of a minnow or other small fish, the movement of the wing-legs imparts a live appearance to the bait, and thus fish are more apt to be attracted thereto and to attempt to swallow it and thus to be caught on one or more of the hooks 9. It is to be observed that, even when the bait is dragged very slowly on the bottom, the wheel will be rotated as a result of the contact of the cups or paddles with the bottom.

What I claim as new, and desire to secure by Letters Patent, is—

1. Artificial bait comprising a body, a member movably mounted thereon, a transverse crank-shaft in said body, means operatively connecting said member and the crank of said shaft, and a water-actuatable wheel fast on said shaft and extending outside of said body.

2. Artificial bait comprising a body, a member movably mounted thereon, a transverse crank-shaft in said body, means operatively connecting said member and the crank of said shaft, and a water-actuatable wheel fast on said shaft and housed mainly within said body and extending below the bottom of the body.

3. Artificial bait comprising a body containing a chamber open at its bottom and having a passage leading from the chamber to its top, a member movably mounted on said body, a rotatable transverse crank-shaft in said chamber, a connecting-rod reciprocable in said passage connected to said member and to the crank of said shaft, and a water-actuatable wheel fast on said shaft and extending below said body.

4. In artificial bait comprising a body, a member movably mounted thereon, a drive-shaft connected with and arranged to actuate said member, a water-actuatable wheel arranged to rotate said shaft, and means associated with said shaft whereby speed thereof is regulated.

5. In artificial bait comprising a body, a member movably mounted thereon, a drive-shaft arranged to actuate said member, journals in which said shaft is mounted, a member turnably associated with one of said journals arranged to bind and release said shaft, and a water-actuatable wheel arranged to rotate said shaft.

6. In artificial bait comprising a body, a member movably mounted thereon, a drive-shaft arranged to actuate said member, journals in which said shaft is mounted, a cap-screw on one of said journals turnable to bind or release said shaft, and a water-actuatable wheel arranged to rotate said shaft.

7. Artificial bait comprising a body, a wing swingably mounted thereon, a transverse crank-shaft in said body, means operatively connecting said wing and the crank of said shaft, journals in which said shaft is mounted, a cap-screw on one of said journals turnable to bind and release said shaft, and a water-actuatable wheel fast on said shaft and extending outside of said body.

In testimony whereof I affix my signature.

LEE ROY CORNELIUS.